United States Patent
Nichols et al.

[11] Patent Number: 6,124,376
[45] Date of Patent: Sep. 26, 2000

[54] INK COMPOSITION FOR INK JET PRINTING

[75] Inventors: Garland J. Nichols, Ontario; Min-Hong Fu, Webster; Gary R. Fague, Canandaigua, all of N.Y.; James P. Bareman, Lynden, Wash.; Francisco E. Torres, San Meteo, Calif.

[73] Assignee: Xerox Corporation, Stamford, Conn.

[21] Appl. No.: 09/138,322

[22] Filed: Aug. 24, 1998

[51] Int. Cl.$^7$ .......................... C09D 11/02; C09D 11/10; C08K 5/5419

[52] U.S. Cl. .............................. 523/160; 524/268

[58] Field of Search .................... 523/160, 161, 523/212; 528/15; 524/268, 860; 106/31.27, 31.28, 31.6, 31.59, 31.89; 556/444

[56] References Cited

U.S. PATENT DOCUMENTS

| | | | |
|---|---|---|---|
| 4,898,920 | 2/1990 | Lee et al. | 525/477 |
| 4,912,157 | 3/1990 | Clark et al. | 524/265 |
| 5,141,556 | 8/1992 | Matrick | 106/20 |
| 5,160,372 | 11/1992 | Matrick | 106/19 R |
| 5,169,438 | 12/1992 | Matrick | 106/22 R |
| 5,180,425 | 1/1993 | Matrick | 106/22 R |
| 5,205,861 | 4/1993 | Matrick | 106/20 D |
| 5,221,334 | 6/1993 | Ma et al. | 106/20 D |
| 5,349,021 | 9/1994 | Rooney et al. | 524/761 |
| 5,356,464 | 10/1994 | Hickman et al. | 106/20 R |
| 5,393,331 | 2/1995 | Loria et al. | 106/31.27 |
| 5,486,549 | 1/1996 | Itagaki et al. | 523/161 |
| 5,510,415 | 4/1996 | Zahrobsky et al. | 524/506 |
| 5,531,818 | 7/1996 | Lin et al. | 106/31.28 |
| 5,555,008 | 9/1996 | Stoffel et al. | 347/100 |
| 5,580,373 | 12/1996 | Lane et al. | 106/20 R |
| 5,623,296 | 4/1997 | Fujino et al. | 347/103 |
| 5,648,405 | 7/1997 | Ma et al. | |
| 5,709,737 | 1/1998 | Malhotra et al. | 106/31.43 |
| 5,714,538 | 2/1998 | Beach et al. | 524/504 |
| 5,719,204 | 2/1998 | Beach et al. | 523/161 |
| 5,750,592 | 5/1998 | Shinozuka et al. | 523/161 |
| 5,772,746 | 6/1998 | Sawada et al. | 106/31.86 |
| 5,852,074 | 12/1998 | Tsutsumi et al. | 523/161 |
| 5,852,075 | 12/1998 | Held | 523/161 |
| 5,888,287 | 3/1999 | Brown et al. | 106/31.58 |
| 5,981,623 | 11/1999 | McCain et al. | 523/160 |

FOREIGN PATENT DOCUMENTS

| | | |
|---|---|---|
| 10-7958 | 1/1998 | Japan. |
| 10-7969 | 1/1998 | Japan. |

*Primary Examiner*—Vasu Jagannathan
*Assistant Examiner*—Callie E. Shosho
*Attorney, Agent, or Firm*—Judith L. Byorick

[57] ABSTRACT

Disclosed is a process which comprises incorporating into an ink jet printing apparatus an ink composition which comprises water, a colorant, and a polymer of the formula

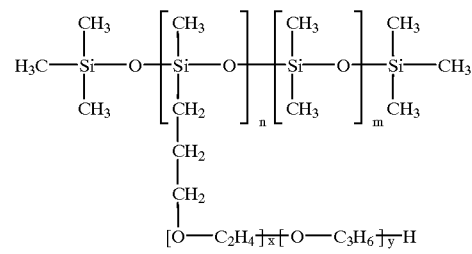

wherein m, n, x, and y are each integers representing the number of repeat monomer units, and wherein the ratio of x:y is from about 10:90 to about 90:10, and causing droplets of the ink to be ejected in an imagewise pattern onto a recording sheet.

30 Claims, No Drawings

INK COMPOSITION FOR INK JET PRINTING

BACKGROUND OF THE INVENTION

The present invention is directed to improved ink jet printing. More specifically, the present invention is directed to aqueous ink compositions which exhibit good performance in ink jet printing processes. One embodiment of the present invention is directed to a process which comprises incorporating into an ink jet printing apparatus an ink composition which comprises water, a colorant, and a polymer of the formula

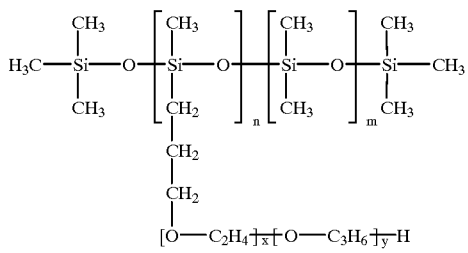

wherein m, n, x, and y are each integers representing the number of repeat monomer units, and wherein the ratio of x:y is from about 10:90 to about 90:10, and causing droplets of the ink to be ejected in an imagewise pattern onto a recording sheet. Another embodiment of the present invention is directed to a process for reducing stitch mottle in ink jet printing which comprises (a) incorporating into an ink jet printing apparatus an ink comprising water, a colorant, and a polymer of the formula

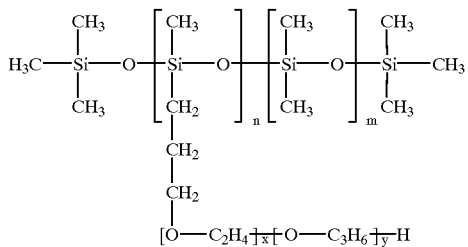

wherein m, n, x, and y are each integers representing the number of repeat monomer units, and wherein the ratio of x:y is from about 10:90 to about 90:10 in an amount effective to reduce stitch mottle, (b) causing a first set of droplets of the ink to be ejected in an imagewise pattern onto a recording sheet in a first swath, and (c) causing a second set of droplets of the ink to be ejected in an imagewise pattern onto a recording sheet in a second swath adjacent to the first swath, wherein stitch mottle between the first swath and the second swath is reduced. Yet another embodiment of the present invention is directed to a process for reducing wet smear in ink jet printing which comprises (a) incorporating into an ink jet printing apparatus an ink comprising water, a colorant, and a polymer of the formula

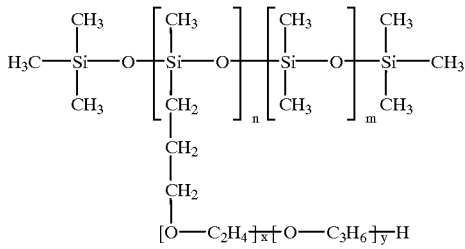

wherein m, n, x, and y are each integers representing the number of repeat monomer units, and wherein the ratio of x:y is from about 10:90 to about 90:10, and (b) causing droplets of the ink to be ejected in an imagewise pattern onto a recording sheet, said polymer being present in the ink in an amount effective to reduce wet smearing of the ink on the substrate. Still another embodiment of the present invention is directed to a process for reducing edge raggedness in ink jet printing which comprises (a) incorporating into an ink jet printing apparatus an ink comprising water, a colorant, and a polymer of the formula

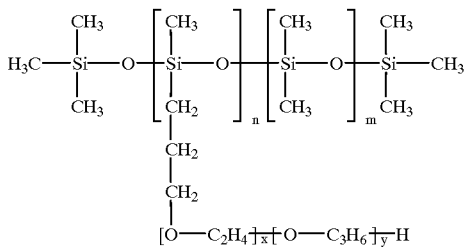

wherein m, n, x, and y are each integers representing the number of repeat monomer units, and wherein the ratio of x:y is from about 10:90 to about 90:10, and (b) causing droplets of the ink to be ejected in an imagewise pattern onto a recording sheet to form an image, said polymer being present in the ink in an amount effective to reduce edge raggedness of the ink image on the substrate.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM Technical Disclosure Bulletin, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (May 1, 1989) and references therein, the disclosure of which is totally incorporated herein by reference.

U.S. Pat. No. 5,750,592, U.S. Pat. No. 5,623,296, U.S. Pat. No. 5,141,556, U.S. Pat. No. 5,160,372, U.S. Pat. No. 5,169,438, U.S. Pat. No. 5,180,425, U.S. Pat. No. 5,205,861, U.S. Pat. No. 5,221,334, U.S. Pat. No. 5,356,464, U.S. Pat. No. 5,555,008, U.S. Pat. No. 5,580,373, and U.S. Pat. No. 5,648,405, the disclosures of each of which are totally incorporated herein by reference, disclose ink compositions containing one or more of the following materials: SILWET® L-77, SILWET® L-7600, SILWET® L-7604, SILWET® L-7607. These materials are polyethylene oxide modified polydimethylsiloxane polymers.

U.S. Pat. No. 5,714,538 (Beach et al.) and U.S. Pat. No. 5,719,204 (Beach et al.), the disclosures of each of which are totally incorporated herein by reference, discloses polymeric dispersants used in formulating aqueous ink compositions. The dispersants are graft copolymers comprising a hydrophilic polymeric segment, a hydrophobic polymeric segment incorporating a hydrolytically-stable siloxyl substituent, and a stabilizing segment, such as a reactive surfactant macromer, a protective colloid monomer, or a non-siloxyl hydrophobic monomer.

U.S. Pat. No. 5,486,549 (Itagaki et al.), the disclosure of which is totally incorporated herein by reference, discloses a water-based printing ink composition exhibiting excellently low foaming behavior with sustainability even under adverse conditions of high temperature and intense shearing force encountered in the printing works. The printing ink composition comprises, besides an organic polymer as the binder resin in the form of an aqueous solution or emulsion and a coloring agent, e.g., dyes and pigments, a silicone-based defoaming composition comprising a polyoxyalkylene-modified polydiorganosiloxane, polydimethylsiloxane, finely divided silica filler and organopolysiloxane resin mainly or solely consisting of monofunctional organosiloxane units and tetrafunctional siloxane units each in a specified weight proportion.

Ink jet printing frequently is performed with a printhead which has a width less than that of the substrate to be printed. The printhead typically traverses across the substrate in a processing direction to print a swath, and the substrate is then advanced in a direction perpendicular or transverse to the processing direction, enabling the printhead to traverse the substrate again and print another swath adjacent to the already-printed swath. Stitch mottle is a phenomenon observed in ink jet printing when nonuniform unprinted areas (appearing, for example, white when printing on white paper) occur where the swaths meet during the printing process. During the printing process, the ink appears to "pull back" from the stitch/swath edges or lines before the ink dries, resulting in nonuniform images and image defects, especially in solid image areas, which appear as unprinted (white, for example, on white paper) lines running across the image in a direction parallel to the swath. The problem is particularly prominent when pigment colorants are employed in the ink. Another problem often encountered in ink jet printing processes is wet smear. Wet smear occurs when an image exhibits smearing when subjected to the action of a wet, dynamic, abrasive physical contact, such as a wetted thumb dragged across the image, a felt tipped marker dragged across the image, or the like. Yet another problem often encountered in ink jet printing processes is edge raggedness (mid frequency line edge noise, referred to as MFLEN) of the printed image on the substrate, especially when the substrate is plain paper.

Accordingly, while known compositions and processes are suitable for their intended purposes, a need remains for improved ink compositions. In addition, a need remains for ink compositions which exhibit reduced stitch mottle when used in ink jet printing processes. Further, a need remains for ink compositions containing pigment colorants which exhibit reduced stitch mottle when used in ink jet printing processes. Additionally, a need remains for ink compositions which exhibit reduced wet smear when applied to a substrate to form an image. There is also a need for ink compositions which exhibit reduced wet smear when used in ink jet printing processes. In addition, there is a need for ink compositions containing pigment colorants which exhibit reduced smear when used in ink jet printing processes. Further, there is a need for ink compositions which exhibit reduced edge raggedness (MFLEN) when used in ink jet printing processes.

SUMMARY OF THE INVENTION

It is an object of the present invention to provide compositions and processes with the above noted advantages.

It is another object of the present invention to provide improved ink compositions.

It is yet another object of the present invention to provide ink compositions which exhibit reduced stitch mottle when used in ink jet printing processes.

It is still another object of the present invention to provide ink compositions containing pigment colorants which exhibit reduced stitch mottle when used in ink jet printing processes.

Another object of the present invention is to provide ink compositions which exhibit reduced wet smear when applied to a substrate to form an image.

Yet another object of the present invention is to provide ink compositions which exhibit reduced wet smear when used in ink jet printing processes.

Still another object of the present invention is to provide ink compositions containing pigment colorants which exhibit reduced smear when used in ink jet printing processes.

It is another object of the present invention to provide ink compositions which exhibit reduced edge raggedness (MFLEN) when used in ink jet printing processes.

These and other objects of the present invention (or specific embodiments thereof) can be achieved by providing a process which comprises incorporating into an ink jet printing apparatus an ink composition which comprises water, a colorant, and a polymer of the formula

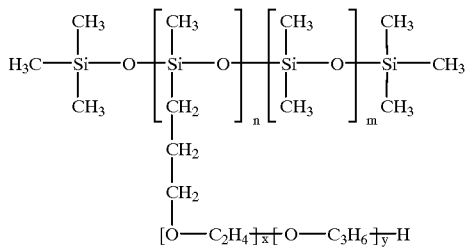

wherein m, n, x, and y are each integers representing the number of repeat monomer units, and wherein the ratio of x:y is from about 10:90 to about 90:10, and causing droplets of the ink to be ejected in an imagewise pattern onto a recording sheet. Another embodiment of the present invention is directed to a process for reducing stitch mottle in ink jet printing which comprises (a) incorporating into an ink jet printing apparatus an ink comprising water, a colorant, and a polymer of the formula

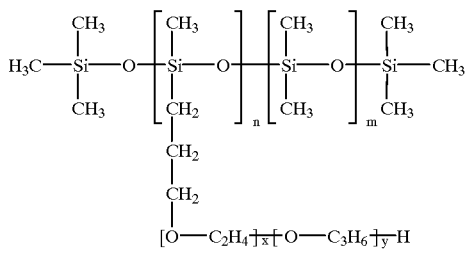

wherein m, n, x, and y are each integers representing the number of repeat monomer units, and wherein the ratio of x:y is from about 10:90 to about 90:10 in an amount effective to reduce stitch mottle, (b) causing a first set of droplets of the ink to be ejected in an imagewise pattern onto a recording sheet in a first swath, and (c) causing a second set of droplets of the ink to be ejected in an imagewise pattern onto a recording sheet in a second swath adjacent to the first swath, wherein stitch mottle between the first swath and the second swath is reduced. Yet another embodiment of the present invention is directed to a process for reducing wet smear in ink jet printing which comprises (a) incorporating into an ink jet printing apparatus an ink comprising water, a colorant, and a polymer of the formula

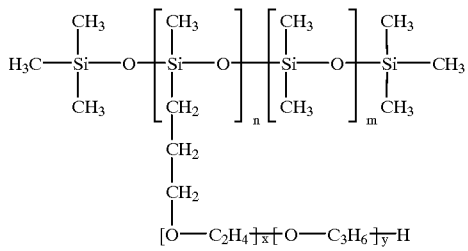

wherein m, n, x, and y are each integers representing the number of repeat monomer units, and wherein the ratio of x:y is from about 10:90 to about 90:10, and (b) causing droplets of the ink to be ejected in an imagewise pattern onto a recording sheet, said polymer being present in the ink in an amount effective to reduce wet smearing of the ink on the substrate. Still another embodiment of the present invention is directed to a process for reducing edge raggedness in ink jet printing which comprises (a) incorporating into an ink jet printing apparatus an ink comprising water, a colorant, and a polymer of the formula

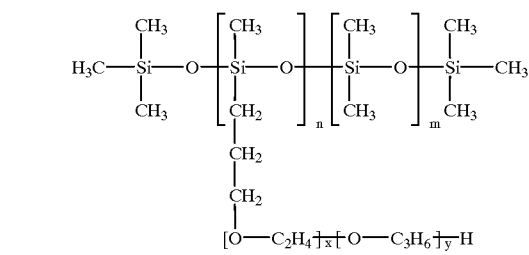

wherein m, n, x, and y are each integers representing the number of repeat monomer units, and wherein the ratio of x:y is from about 10:90 to about 90:10, and (b) causing droplets of the ink to be ejected in an imagewise pattern onto a recording sheet to form an image, said polymer being present in the ink in an amount effective to reduce edge raggedness of the ink image on the substrate.

DETAILED DESCRIPTION OF THE INVENTION

The inks of the present invention contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks for the present invention also contain a colorant. The colorant for the first ink can be either a dye or a pigment. Any suitable or desired dye can be employed in the first ink, including anionic dyes, cationic dyes, nonionic dyes, zwitterionic dyes, and the like. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52,58,60,61,63,92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes(No. 3,7,17,19,23,25,29,38,42,49,59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, NY; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments for the inks of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2GO1 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange Oreg. 2673 (Paul Uhlich), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355

(BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), CAB-O-JET 200 hydrophilic carbon black (Cabot Corp.), CAB-0-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, dispersions available from BASF, including Disperse Black 00-6607, Luconyl Yellow 1250, Basoflex Pink 4810, Luconyl Blue 7050, and the like, dispersions available from Keystone Aniline Corp., such as Keystone Jet Print Micro Black (Pigment Black 7), Keystone Jet Print Micro Blue (Pigment Blue 15:3), Keystone Jet Print Micro Magenta (Pigment Red 122), Keystone Jet Print Micro Yellow (Pigment Yellow 13), and the like, dispersions available from Bayer AG, such as Bayscript Yellow P PZD 101440 (Pigment Yellow 74), Bayscript Magenta P PAD 101090 (Pigment Red 122), and the like. Additional examples of suitable hydrophilic pigment particles include the colored silica particles prepared as disclosed in, for example, U.S. Pat. No. 4,877,451 and U.S. Pat. No. 5,378,574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

In one embodiment, the pigment particles are present in combination with a resin emulsion, wherein the resin emulsion acts as a binding agent for the pigment particles. The resin emulsion typically comprises resin particles and solubilized resin derived from the polymerization in water of an olefinic acid, such as acrylic acid or methacrylic acid, and an olefinic acrylate or methacrylate, such as methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate, dodecyl acrylate, dodecyl methacrylate, benzyl acrylate, benzyl methacrylate, polyethyleneglycol acrylate, polyethyleneglycol methacrylate, polyoxyalkylene acrylate, polyoxyalkylene methacrylate, or the like. Typical polyoxyalkylene acrylates and methacrylates include those of the general formula

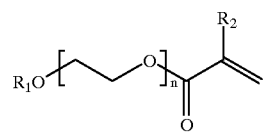

wherein R is a hydrogen atom or an alkyl group, typically with from 1 to about 6 carbon atoms, and n is a number representing the number of repeat monomer units, typically being from 2 to about 100.

The resin typically has a number average molecular weight of from about 1,000 to about 15,000 grams per mole and a weight average molecular weight of from about 1,500 to about 40,000, although the molecular weight values can be outside of these ranges. The resin particles typically have an average particle diameter of from about 30 to about 300 nanometers, although the average particle diameter can be outside of this range. The resin emulsion typically comprises from about 60 to about 99 percent by weight resin particles and from about 1 to about 40 percent by weight solubilized resin, and preferably comprises from about 90 to about 97 percent by weight resin particles and from about 3 to about 10 percent by weight solubilized resin, although the relative amounts can be outside of these ranges. Both the resin particles and the solubilized resin can be generated from a free radical type process in water, wherein one of the monomers is water soluble, such as an acrylic acid or a methacrylic acid, and the other monomer(s) exhibit low solubility in water (for example, from about 0.05 to about 2 percent by weight soluble in water), such as an alkyl acrylate or an alkyl methacrylate or a polyoxyalkylene(meth)acrylate.

The free radical initiator is generally an emulsion type initiator, such as a persulfate, like potassium or ammonium persulfate. Chain transfer agents can be used to adjust the molecular weight of the resin and to adjust the resin particle to solubilized resin ratio. Suitable chain transfer agents include alkylthiols, such as dodecanethiol, halogenated hydrocarbons, such as carbon tetrabromide, or, preferably, a combination of an alkylthiol and a halogenated hydrocarbon. Surfactants can also be incorporated into the resin emulsion, including anionic, cationic, and nonionic surfactants. Examples of suitable surfactants include sodium dodecylbenzene sulfonate, polyethylene oxide, polyethylene oxide nonyl phenyl ether, tetraalkyl ammonium chloride, sodium naphthalene sulfonate, and the like, typically present in an amount of from about 0.005 to about 20 weight percent of the resin, and preferably from about 0.1 to about 5 percent by weight of the resin, although the amount can be outside of these ranges. Generally, the olefinic acidic monomer comprises from about 5 to about 20 parts by weight of the resins, the olefinic alkyl(meth)acrylate comprises from about 40 to about 60 parts by weight of the resins, and the polyethyleneglycol methacrylate, or, more generally, a low molecular weight polyethylene glycol capped with a methacrylate or acrylate, comprises from about 0 to about 20 parts by weight of the resins. Although both the resin particles and the solubilized resin are derived from the same monomers, the monomer content may be different in the resin particles as compared to the solubilized resin; more specifically, the solubilized resin may contain a higher content of acidic monomer than the resin particles.

Further information regarding resin emulsions suitable for dispersing or binding pigment colorants is disclosed in, for example, U.S. Pat. No. 5,766,818; copending application U.S. Ser. No. 08/869,962, filed Jun. 5, 1997, entitled "Ink Compositions," with the named inventors Guerino G. Sacripante, Garland J. Nichols, Elizabeth A. Kneisel, and Chieh-Min Cheng; copending application U.S. Ser. No. 08/828,850, filed Mar. 31, 1997, entitled "Ink Compositions," with the named inventors Garland J. Nichols, Daniel G. Marsh, and Chieh-Min Cheng; and copending application U.S. Ser. No. 08/960,754, filed Oct. 29, 1997, entitled "Surfactants," with the named inventors Nan-Xing Hu, Paul F. Smith, and Beng S. Ong; the disclosures of each of which are totally incorporated herein by reference.

The inks of the present invention also contain a polymer of the formula

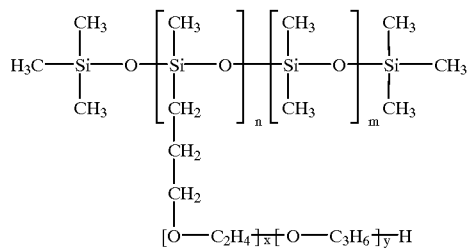

wherein m, n, x, and y are each integers representing the number of repeat monomer units. The value of x typically ranges from about 8 to about 60, preferably from about 10 to about 50, and more preferably from about 12 to about 45, although the value of x can be outside of these ranges. The value of y typically ranges from about 2 to about 20, preferably from about 3 to about 18, and more preferably from about 5 to about 16, although the value of can be outside of these ranges. The ratio of x:y typically is from about 10:90 to about 90:10, preferably from about 12:88 to about 80:20, and more preferably from about 14:86 to about 75:25, although the ratio can be outside of these ranges. The value of n typically ranges from about 3 to about 60, preferably from about 4 to about 40, and more preferably from about 5 to about 30, although the value of n can be outside of these ranges. The value of m typically ranges from about 10 to about 98, preferably from about 15 to about 70, and more preferably from about 20 to about 50, although the value of m can be outside of these ranges. The ratio of n:m typically is from about 2:98 to about 10:90, preferably from about 3:97 to about 15:85, and more preferably from about 5:95 to about 20:80, although the ratio can be outside of these ranges. The values of x, y, n, and m are such that the polymer typically has a weight average molecular weight of from about 1,200 to about 60,000, preferably from about 3,000 to about 55,000, and more preferably from about 6,000 to about 50,000, although the molecular weight can be outside of these ranges. Polymers of the above formula are commercially available as, for example, TEGOPREN® 5883 and 5884, available from Goldschmidt Chemical Corp., Hopewell, Va., of the above formula wherein the ratio of ethylene oxide to propylene oxide repeat groups by weight is about 77:23, the ratio of n:m is about 1:6, and the weight average molecular weight is about 50,000, as well as other members of the TEGOPREN® family, such as 5851, 5863, 5852, 5857, and the like, as well as some members of the SILWET® family, available from Witco Corp., Greenwich, Conn., such as L-7210, L-7220, L-7230, L-7002, L-7500, L-7001, L-7200, L-7280, L-7087, and the like. The polymer is present in the ink in any desired or effective amount, typically from about 0.2 to about 3 percent by weight of the ink, preferably from about 0.3 to about 2 percent by weight of the ink, and more preferably from about 0.5 to about 1.5 percent by weight of the ink, although the amount can be outside of these ranges.

While not being limited to any particular theory, it is believed that the presence of the siloxane copolymer may help maintain pigment aggregates onto the print substrate, so less mobility of the pigment occurs, thereby reducing stitch mottle. In addition, it is believed that the siloxane copolymer coats the print substrate and helps to provide a barrier which prevents further migration of the pigment in the printed image, thereby reducing stitch mottle. With respect to wet smear, it is believed that pigment colorants in inks exhibit wet smear as a result of insufficient binding of the pigment particles to each other and to the print substrate; the presence of the siloxane copolymer is believed to aid in holding the pigment particles to the print substrate, thereby reducing wet smear. With respect to edge raggedness and MFLEN, it is believed that the presence of the siloxane copolymer, by aiding in holding the pigment particles to the print substrate, reduce penetration of the ink and feathering of the image.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

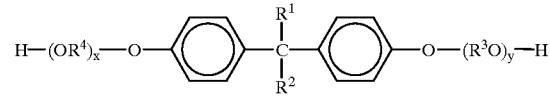

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating the ink of the present invention into an ink jet printing apparatus and causing droplets of the ink to be ejected in an imagewise pattern onto a recording sheet. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the printing apparatus employs an acoustic ink jet process, wherein droplets of the ink are caused to be ejected in imagewise pattern by acoustic beams. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

COMPARATIVE EXAMPLE A

A black colored ink jet ink composition was prepared by mixing 22 percent by weight of sulfolane (obtained from BASF), 6 percent by weight of 2-pyrrolidinone (obtained from Aldrich Chemical Co.), 0.05 percent by weight of a polyethylene oxide/bisphenol A polymer of the formula

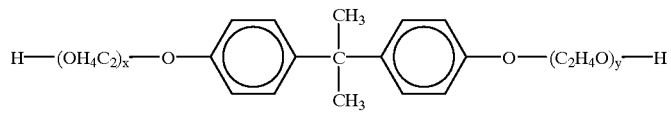

with a molecular weight of 18,500 (obtained from Polysciences), and water. The ingredients were stirred for about 5 to 10 minutes to obtain a homogeneous mixture.

An acrylic resin emulsion comprising resins was derived from 23.6 percent by weight of methacrylic acid, 55.4 percent by weight of benzyl methacrylate, 21 percent by weight of polyethyleneglycol methacrylate ($M_w$=246), 3 percent by weight of dodecanethiol, and 1 percent by weight of carbon tetrabromide. A one liter kettle equipped with a mechanical stirrer was charged with 240 grams of water, 1.8 grams of sodium dodecylbenzene sulfonate (obtained from Rhone-Poulenc as Rhodacal Ds-10), and 2 grams of Triton X-100 (alkylphenoxypolyethanol, obtained from Aldrich Chemical Co.), and the mixture was stirred for 2 hours at about 100 rpm. To this solution were then added 1.8 grams of ammonium persulfate, followed by the addition of a mixture containing 28.3 grams of methacrylic acid, 66.5 grams of benzyl methacrylate, 25.2 grams of polyethyleneglycol methacrylate ($M_w$=246), 3.6 grams of dodecanethiol, and 1.2 grams of carbon tetrabromide. The mixture was heated to 80° C. for 6 hours. Thereafter, the resin emulsion was cooled to room temperature, and a sample (about 10 grams) was freeze dried and analyzed by GPC. The resin had a number average molecular weight of about 20,580 and a weight average molecular weight of about 8,193, with a polydispersity of 2.5.

To the liquid vehicle mixture was added dropwise a solution containing about 1.48 percent solids equivalent of the acrylic resin emulsion, and the mixture was stirred for about 5 minutes. The resultant mixture was added to a solution containing 2.5 percent by weight Cabojet 300 carbon black colorant (obtained from Cabot Corporation). The ink mixture was stirred for 5 to about 10 minutes and then filtered through a 1 micron glass fiber filter.

COMPARATIVE EXAMPLE B

A black colored ink jet ink composition was prepared by mixing 29.95 percent by weight of sulfolane (obtained from BASF), 6 percent by weight of 2-pyrrolidinone (obtained from Aldrich Chemical Co.), 0.05 percent by weight of a polyethylene oxide/bisphenol A polymer of the formula

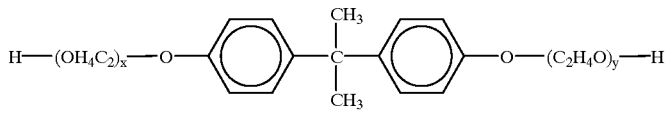

with a molecular weight of 18,500 (obtained from Polysciences), and water. The ingredients were stirred for about 5 to 10 minutes to obtain a homogeneous mixture. An acrylic resin emulsion, prepared as described in Comparative Example A, about 1.48 percent solids equivalent, was added dropwise to the liquid vehicle mixture and stirred for about 5 minutes. The resultant mixture was added to a solution containing 3.34 percent by weight Cabojet 300 carbon black colorant (obtained from Cabot Corporation). The ink mixture was stirred for 5 to about 10 minutes and then filtered through a 1 micron lass fiber filter.

EXAMPLE I

A black colored ink jet ink composition was prepared by mixing 22 percent by weight of sulfolane (obtained from BASF), 6 percent by weight of 2-pyrrolidinone (obtained from Aldrich Chemical Co.), 0.05 weight percent of a polyethylene oxide/bisphenol A polymer with a molecular weight of 18,500 (obtained from Polysciences), and water. The ingredients were stirred to obtain a homogeneous mixture for about 5 to 10 minutes. One percent by weight of the polysiloxane-polyether copolymer Tegopren 5884 (obtained from Goldschmidt) was added to the mixture and stirred for about 10 minutes to obtain a homogeneous mixture. An acrylic resin emulsion, prepared as described in Comparative Example A, about 1.48 percent solids equivalent, was added dropwise to the liquid vehicle mixture and stirred for about 5 minutes. The resultant mixture was added to a solution containing 2.5 percent by weight Cabojet 300 carbon black colorant (Cabot Corporation). The ink mixture was stirred for 5 to about 10 minutes and then filtered through a 1 micron glass fiber filter.

EXAMPLE II

A black colored ink jet ink composition was prepared by mixing 22 percent by weight of sulfolane (obtained from BASF), 6 percent by weight of 2-pyrrolidinone (obtained from Aldrich Chemical Co.), 0.05 percent by weight of a polyethylene oxide/bisphenol A polymer with a molecular weight of 18,500 (obtained from Polysciences), and water. The ingredients were stirred for about 5 to 10 minutes to obtain a homogeneous mixture. One percent by weight of the polysiloxane-polyether copolymer Tegopren 5884 (obtained from Goldschmidt) was added to the mixture and stirred for about 10 minutes to obtain a homogeneous mixture. The resultant mixture was added to a solution containing 2.5 percent by weight Cabojet 300 carbon black colorant (obtained from Cabot Corporation). The ink mixture was stirred for 5 to about 10 minutes and then filtered through a 1 micron glass fiber filter.

EXAMPLE III

A black colored ink jet ink composition was prepared by mixing 22 percent by weight of sulfolane (obtained from BASF), 6 percent by weight of 2-pyrrolidinone (obtained from Aldrich Chemical Co.), 0.05 weight percent of a polyethylene oxide/bisphenol A polymer with a molecular weight of 18,500 (obtained from Polysciences), and water. The ingredients were stirred for about 5 to 10 minutes to obtain a homogeneous mixture. Thereafter, 0.54 percent by weight of the polysiloxane-polyether copolymer Tegopren 5884 (obtained from Goldschmidt) was added to the mixture and stirred for about 10 minutes to obtain a homogeneous mixture. An acrylic resin emulsion, prepared as described in Comparative Example A, about 0.50 percent solids equivalent, was added dropwise to the liquid vehicle mixture and stirred for about 5 minutes. The resultant mixture was added to a solution containing 2.65 weight percent Cabojet 300 carbon black colorant (obtained from Cabot Corporation). The ink mixture was stirred for 5 to about 10 minutes and then filtered through a 1 micron glass fiber filter.

EXAMPLE IV

A black colored ink jet ink composition was prepared by mixing 29.95 percent by weight of sulfolane (obtained from BASF), 6 percent by weight of 2-pyrrolidinone (obtained from Aldrich Chemical Co.), 0.05 percent by weight of a polyethylene oxide/bisphenol A polymer with a molecular weight of 18,500 (obtained from Polysciences), and water. The ingredients were stirred to obtain a homogeneous mixture for about 5 to 10 minutes. One percent by weight of the polysiloxane-polyether copolymer Tegopren 5884 (obtained from Goldschmidt) was added to the mixture and stirred for about 10 minutes to obtain a homogeneous mixture. An acrylic resin emulsion, prepared as described in Comparative Example A, about 0.68 percent solids equivalent, was added dropwise to the liquid vehicle mixture and stirred for about 5 minutes. The resultant mixture was added to a solution containing 3.34 percent by weight Cabojet 300 carbon black colorant (obtained from Cabot Corporation). The ink mixture was stirred for 5 to about 10 minutes and then filtered through a 1 micron glass fiber filter.

EXAMPLE V

A black colored ink jet ink composition was prepared by mixing 29.95 percent by weight of sulfolane (obtained from BASF), 6 percent by weight of 2-pyrrolidinone (obtained from Aldrich Chemical Co.), 0.05 weight percent of a polyethylene oxide/bisphenol A polymer with a molecular weight of 18,500 (obtained from Polysciences), and water. The ingredients were stirred for about 5 to 10 minutes to obtain a homogeneous mixture. One percent by weight of the polysiloxane-polyether copolymer Tegopren 5884 (obtained from Goldschmidt) was added to the mixture and stirred for about 10 minutes to obtain a homogeneous mixture. The resultant mixture was added to a solution containing 3.34 percent by weight Cabojet 300 carbon black colorant (obtained from Cabot Corporation). The ink mixture was stirred for 5 to about 10 minutes and then filtered through a 1 micron glass fiber filter.

EXAMPLE VI

A black colored ink jet ink composition was prepared by mixing 29.95 percent by weight of sulfolane (obtained from BASF), 6 percent by weight of 2-pyrrolidinone (obtained from Aldrich Chemical Co.), 0.05 percent by weight of a polyethylene oxide/bisphenol A polymer with a molecular weight of 18,500 (obtained from Polysciences), and water. The ingredients were stirred for about 5 to 10 minutes to obtain a homogeneous mixture. One percent by weight of the polysiloxane-polyether copolymer Tegopren 5851 (obtained from Goldschmidt) was added to the mixture and stirred for about 10 minutes to obtain a homogeneous mixture. An acrylic resin emulsion, prepared as described in Comparative Example A, about 0.68 percent solids equivalent, was added dropwise to the liquid vehicle mixture and stirred for about 5 minutes. The resultant mixture was added to a solution containing 3.34 percent by weight Cabojet 300 carbon black colorant (obtained from Cabot Corporation). The ink mixture was stirred for 5 to about 10 minutes and then filtered through a 1 micron glass fiber filter.

EXAMPLE VII

A black colored ink jet ink composition was prepared by mixing 29.95 percent by weight of sulfolane (obtained from BASF), 6 percent by weight of 2-pyrrolidinone (obtained from Aldrich Chemical Co.), 0.05 percent by weight of a polyethylene oxide/bisphenol A polymer with a molecular weight of 18,500 (obtained from Polysciences), and water. The ingredients were stirred for about 5 to 10 minutes to obtain a homogeneous mixture. One percent by weight of the polysiloxane-polyether copolymer Tegopren 5863 (obtained from Goldschmidt) was added to the mixture and stirred for about 10 minutes to obtain a homogeneous mixture. An acrylic resin emulsion, prepared as described in Comparative Example A, about 0.68 percent solids equivalent, was added dropwise to the liquid vehicle mixture and stirred for about 5 minutes. The resultant mixture was added to a solution containing 3.34 percent by weight Cabojet 300 carbon black colorant (obtained from Cabot Corporation). The ink mixture was stirred for 5 to about 10 minutes and then filtered through a 1 micron glass fiber filter.

EXAMPLE VIII

A black colored ink jet ink composition was prepared by mixing 29.95 percent by weight of sulfolane (obtained from BASF), 6 percent by weight of 2-pyrrolidinone (obtained from Aldrich Chemical Co.), 0.05 weight percent of a polyethylene oxide/bisphenol A polymer with a molecular weight of 18,500 (obtained from Polysciences), and water. The ingredients were stirred for about 5 to 10 minutes to obtain a homogeneous mixture. One percent by weight of the polysiloxane-polyether copolymer Silwet L7230 (obtained from OSI Group, Witco Corporation) was added to the mixture and stirred for about 10 minutes to obtain a homogeneous mixture. An acrylic resin emulsion, prepared as described in Comparative Example A, about 0.68 percent solids equivalent, was added dropwise to the liquid vehicle mixture and stirred for about 5 minutes. The resultant mixture was added to a solution containing 3.34 percent by weight Cabojet 300 carbon black colorant (obtained from Cabot Corporation). The ink mixture was stirred for 5 to about 10 minutes.

EXAMPLE IX

The properties of the ink compositions prepared in Comparative Examples A and B and Examples I through VIII were evaluated in the following manner:
A) Physical Properties:
  The viscosity of the ink was measured at 25° C. using a Brookfield Model DV-11 viscometer.
  The surface tension of the ink was measured at 25° C. using a Kruss model K10T plate tensiometer.
  The pH was measured at 25° C. using a Corning model 345 pH meter.
B) Optical Density:
  Ink was filled in a cleaned Hewlett-Packard 51645A cartridge. An image was printed by a Hewlett-Packard 850C ink jet printer on Xerox Courtland 4024DP paper and Xerox Images Series LX paper. The optical density of the printed image was measured by an X-Rite densitometer.
C) Wet Smear Resistance:
  One measure of image quality and permanence is the resistance of the printed image to wet smear. The wet smear evaluation was designed to measure the permanence of an image with regard to its susceptibility to being smeared by the action of a wet, dynamic, abrasive physical contact (such as a wetted thumb dragged across the image, "wet thumb test"). The test pattern used for the wet smear test was a set of 22 lines of a specific ink 50 millimeters in length and 1.2 millimeters in thickness, with the lines separated by a distance of 6 millimeters. Ink was filled in a cleaned HP51645A cartridge. An image containing a series of vertical lines was printed by a HP850C ink jet printer on Xerox Images Series LX paper. This pattern was printed and "aged" for a specified time (e.g., 1 day but no longer than 4 days) before wet smear testing. A felt wick [Dri Mark Products Market parts: Filler (part# 600F) and Wide Chisel Tip Nib (part #600N)] was prewetted with distilled water and inserted into the pen of the wet smear testing apparatus. The assembly was then lowered until it contacted the surface of a white plastic strip with a 100 grams mass loading. The pen was then set in motion across the line pattern on a test document. The process was repeated with virgin felt pens across different segments of the test pattern. The paper was then removed and the optical density of the smeared areas (between the lines) was measured with a densitometer, X-Rite 428, or equivalent. Optical density was measured in at least four locations along the wet smear path (in the middle of the swath immediately following the 6th, 10th, 14th, and 18th bands on the document, for the first and second wet smear swaths). The average OD in the smear transfer area from the 8 measurements was recorded, and the background OD was subtracted to give the "smear OD", average smear (minus background).
D) Stitch Mottle:
  Ink was filled in a cleaned cartridge. A solid patch image printed in a single pass mode was printed by a HP850C ink jet printer on Xerox Images Series LX paper. The printhead was aligned through standard printer procedures. The stitch mottle was observed at the interface of the first swath and second swath of the solid area patch. A grading system of 1–5 was given for each print, where 1 was poor, showing complete white spacing between swaths, 3 represented a gradation in the stitch region, showing a mottled or lighter density than the rest of the solid area, and 5 was excellent, showing complete coverage of the stitch line with minimal visible differences in the solid area.
E) MFLEN:
  Ink was filled in a cleaned cartridge. An image with horizontal lines was printed by a HP855C ink jet printer on Xerox Images Series LX paper. The line edge raggedness was measured through a high-resolution camera, and software was used to measure the mid-frequency noise of the line. Low values indicated sharp lines and high values indicated feathering of the line.
Physical Properties of the Inks:

| Ink | Viscosity (centipoise) | Surface Tension (dynes/cm) | pH |
|---|---|---|---|
| Comp. A | 2.00 | 42.7 | 6.56 |
| Comp. B | 2.41 | 42.3 | 6.92 |
| I | 2.11 | 34.7 | 6.48 |
| II | 1.94 | 32.8 | 8.77 |
| III | 2.05 | 32.5 | 7.09 |
| IV | 2.54 | 33.4 | 7.00 |
| V | 2.45 | 32.5 | 8.44 |
| VI | 2.45 | 29.4 | 6.98 |
| VII | 2.47 | 30.1 | 7.03 |
| VIII | 2.71 | 33.5 | 6.90 |

Performance Data: Stitch Mottle (SM), Wet Smear (WS), Line Edge Raggedness (ER), Optical Density (OD)

| Ink | resin wt. % | additive | EO/PO wt % | SM | WS (LX paper) | ER | OD (LX paper) | OD (4024 paper) |
|---|---|---|---|---|---|---|---|---|
| I | 1.48 | 5884 | 77/23 | 5 | 0.06 | 1 | 1.46 | 1.40 |
| II | 0.5 | 5884 | 77/23 | 5 | 0.08 | 1 | 1.52 | * |
| III | — | 5884 | 77/23 | 5 | 0.04 | 1 | 1.42 | 1.41 |
| A | 1.48 | — | — | 2 | 0.17 | 1 | 1.40 | 1.48 |
| IV | 1 | 5884 | 77/23 | 5 | 0.11 | 2 | 1.61 | 1.60 |
| V | — | 5884 | 77/23 | 5 | * | 1 | 1.48 | * |
| VI | 0.68 | 5851 | 75/25 | 5 | 0.24 | 4 | 1.50 | 1.54 |
| VII | 0.68 | 5863 | 40/60 | 4.5 | 0.33 | 0.5 | 1.48 | 1.51 |
| VIII | 0.68 | L7320 | 40/60 | 5 | 0.20 | 1 | 1.60 | 1.59 |
| B | 0.68 | — | — | 2 | 0.25 | 1 | 1.30 | 1.54 |

* = not measured
Line edge raggedness rating:
<5 excellent,
5–15 acceptable,
>15 poor feathering Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A process which comprises incorporating into an ink jet printing apparatus an ink composition which consists essentially of (a) water, (b) a colorant, (c) a polymer of the formula

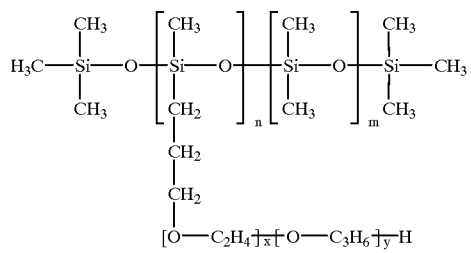

wherein m, n, x, and y are each integers representing the number of repeat monomer units, and wherein the ratio of x:y is from about 10:90 to about 90:10, (d) one or more optional humectants or cosolvents, (e) an optional resin emulsion, (f) an optional biocide, (g) an optional pH controlling agent, and (h) an optional polyalkylene oxide additive, and causing droplets of the ink to be ejected in an imagewise pattern onto a recording sheet.

2. A process according to claim 1 wherein the colorant is a dye.

3. A process according to claim 1 wherein the colorant is a pigment.

4. A process according to claim 3 wherein the ink further contains a resin emulsion comprising resin particles and solubilized resin.

5. A process according to claim 1 wherein x is from about 8 to about 60.

6. A process according to claim 1 wherein y is from about 2 to about 20.

7. A process according to claim 1 wherein the ratio of x:y is from about 12:88 to about 80:20.

8. A process according to claim 1 wherein m is from about 10 to about 98.

9. A process according to claim 1 wherein n is from about 3 to about 60.

10. A process according to claim 1 wherein the ratio of n:m is from about 2:98 to about 10:90.

11. A process according to claim 1 wherein the polymer has a weight average molecular weight of from about 1,200 to about 60,000.

12. A process according to claim 1 wherein the ratio of x:y is about 77:23, the ratio of n:m is about 1:6, and the weight average molecular weight of the polymer is about 50,000.

13. A process according to claim 1 wherein the polymer is present in the ink in an amount of from about 0.2 to about 3 percent by weight.

14. A process according to claim 1 wherein the ink jet printing apparatus employs an acoustic ink jet process, wherein droplets of the ink are caused to be ejected in imagewise pattern by acoustic beams.

15. A process according to claim 1 wherein the recording sheet is paper.

16. A process according to claim 1 wherein the recording sheet is a transparent polymeric material.

17. A process according to claim 1 wherein the polymer has a molecular weight of at least about 50,000.

18. A process according to claim 1 wherein the optional humectants or cosolvents are selected from ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones, alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, or mixtures thereof.

19. A process according to claim 1 wherein the optional humectants or cosolvents are selected from sulfolane, 2-pyrrolidinone, or mixtures thereof.

20. A process according to claim 1 wherein the optional resin emulsion comprises resin particles and solubilized resin derived from the polymerization in water of an olefinic acid and an olefinic acrylate or methacrylate.

21. A process according to claim 1 wherein the optional resin emulsion comprises resin particles and solubilized resin derived from the polymerization in water of methacrylic acid, benzyl methacrylate, and polyethylene glycol methacrylate.

22. A process according to claim 1 wherein the ink jet printing apparatus employs a thermal ink jet process wherein the ink in the nozzles is selectively heated in an imagewise pattern, thereby causing droplets of the ink to be ejected in imagewise pattern.

23. A process for reducing stitch mottle in ink jet printing which comprises (a) incorporating into an ink jet printing apparatus an ink consisting essentially of (i) water, (ii) a colorant, (iii) a polymer of the formula

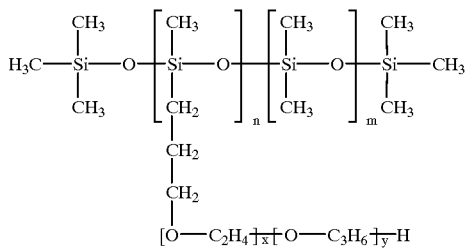

wherein m, n, x, and y are each integers representing the number of repeat monomer units, and wherein the ratio of x:y is from about 10:90 to about 90:10 in an amount effective to reduce stitch mottle, (iv) one or more optional humectants or cosolvents, (v) an optional resin emulsion, (vi) an optional biocide, (vii) an optional pH controlling agent, and (viii) an optional polyalkylene oxide additive, (b) causing a first set of droplets of the ink to be ejected in an imagewise pattern onto a recording sheet in a first swath, and (c) causing a second set of droplets of the ink to be ejected in an imagewise pattern onto a recording sheet in a second swath adjacent to the first swath, wherein stitch mottle between the first swath and the second swath is reduced.

24. A process for reducing wet smear in ink jet printing which comprises (a) incorporating into an ink jet printing apparatus an ink consisting essentially of (i) water, (ii) a colorant, (iii) a polymer of the formula

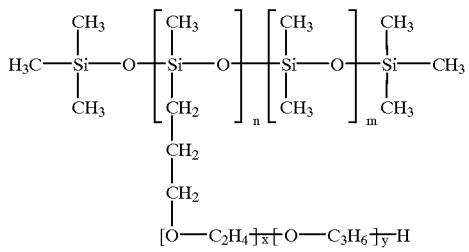

wherein m, n, x, and y are each integers representing the number of repeat monomer units, and wherein the ratio of x:y is from about 10:90 to about 90:10, (iv) one or more optional humectants or cosolvents, (v) an optional resin emulsion, (vi) an optional biocide, (vii) an optional pH controlling agent, and (viii) an optional polyalkylene oxide additive, and (b) causing droplets of the ink to be ejected in an imagewise pattern onto a recording sheet, said polymer being present in the ink in an amount effective to reduce wet smearing of the ink on the substrate.

25. A process for reducing edge raggedness in ink jet printing which comprises (a) incorporating into an ink jet printing apparatus an ink consisting essentially of (i) water, (ii) a colorant, (iii) a polymer of the formula

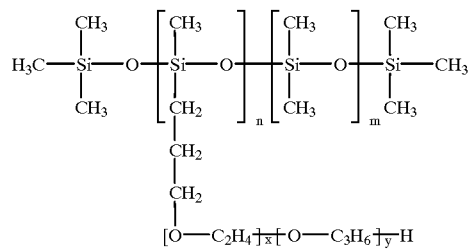

wherein m, n, x, and y are each integers representing the number of repeat monomer units, and wherein the ratio of x:y is from about 10:90 to about 90:10, (iv) one or more optional humectants or cosolvents, (v) an optional resin emulsion, (vi) an optional biocide, (vii) an optional pH controlling agent, and (viii) an optional polyalkylene oxide additive, and (b) causing droplets of the ink to be ejected in an imagewise pattern onto a recording sheet to form an image, said polymer being present in the ink in an amount effective to reduce edge raggedness of the ink image on the substrate.

26. A process which comprises incorporating into an ink jet printing apparatus an ink composition which consists of (a) water, (b) a colorant, (c) a polymer of the formula

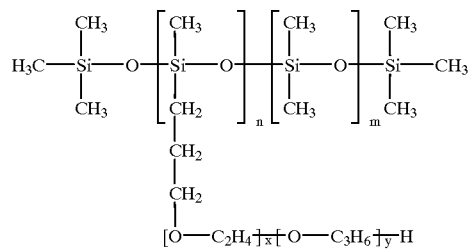

wherein m, n, x, and y are each integers representing the number of repeat monomer units, and wherein the ratio of x:y is from about 10:90 to about 90:10, (d) one or more optional humectants or cosolvents, (e) an optional resin emulsion, (f) an optional biocide, (g) an optional pH controlling agent, and (h) an optional polyalkylene oxide additive, and causing droplets of the ink to be ejected in an imagewise pattern onto a recording sheet.

27. A process according to claim 26 wherein the optional humectants or cosolvents are selected from ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones, alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, or mixtures thereof.

28. A process according to claim 26 wherein the optional humectants or cosolvents are selected from sulfolane, 2-pyrrolidinone, or mixtures thereof.

29. A process according to claim 26 wherein the optional resin emulsion comprises resin particles and solubilized resin derived from the polymerization in water of an olefinic acid and an olefinic acrylate or methacrylate.

30. A process according to claim 26 wherein the optional resin emulsion comprises resin particles and solubilized resin derived from the polymerization in water of methacrylic acid, benzyl methacrylate, and polyethylene glycol methacrylate.

* * * * *